(12) United States Patent
Burton

(10) Patent No.: US 7,240,638 B2
(45) Date of Patent: Jul. 10, 2007

(54) APPARATUS FOR TRAINING A DOG TO HEEL

(76) Inventor: Shelley Burton, #68, 3400-48 Street, Stony Plain (CA) T7Z 1S1

( * ) Notice: Subject to any disclaimer, the term of this patent is extended or adjusted under 35 U.S.C. 154(b) by 0 days.

(21) Appl. No.: 11/205,350

(22) Filed: Aug. 17, 2005

(65) Prior Publication Data

US 2006/0180095 A1     Aug. 17, 2006

(51) Int. Cl.
*A01K 27/00* (2006.01)
(52) U.S. Cl. .......................... 119/770; 119/857
(58) Field of Classification Search ............... 119/770, 119/792, 795, 797, 784, 857, 856, 793, 907, 119/771
See application file for complete search history.

(56) References Cited

U.S. PATENT DOCUMENTS

| | | | |
|---|---|---|---|
| 4,182,272 A | 1/1980 | Taff | |
| 4,667,624 A | 5/1987 | Smith | |
| 5,038,719 A | 8/1991 | McDonough | |
| 5,080,045 A | 1/1992 | Reese et al. | |
| 5,161,486 A | 11/1992 | Brown | |
| D350,628 S | 9/1994 | Williams | |
| 5,598,812 A * | 2/1997 | Graham et al. | 119/771 |
| 5,806,466 A * | 9/1998 | Pintor et al. | 119/770 |
| 6,095,093 A | 8/2000 | Kisko et al. | |
| 6,155,546 A | 12/2000 | Whitener | |
| 6,192,835 B1 | 2/2001 | Calhoun et al. | |
| 6,325,023 B1 | 12/2001 | Elnatan | |
| 6,450,129 B1 | 9/2002 | Flynn | |

* cited by examiner

*Primary Examiner*—T. Nguyen
(74) *Attorney, Agent, or Firm*—Davis Bujold & Daniels, P.L.L.C.

(57) ABSTRACT

An apparatus for training a dog to heel includes an elongated body adapted to be vertically positioned against an outside portion of a leg of a dog trainer. The body has a top end and a bottom end. The top end is adapted for positioning against the leg in the vicinity of the upper thigh of the dog trainer. The bottom end is adapted for positioning against the leg in the vicinity of a lower calf of the dog trainer. Straps are provided at intervals along the body. The straps are adapted for strapping the body to the leg of the dog trainer. More than one training strap coupling is positioned at spaced vertical intervals along the body. The dog trainer connects a short training strap extending to a collar of a dog being trained at a selected training strap coupling at a height of the collar of the dog.

7 Claims, 5 Drawing Sheets

APPARATUS FOR TRAINING A DOG TO HEEL

FIELD OF THE INVENTION

The present invention relates to dog training apparatus, which is used to train a dog to heel.

BACKGROUND OF THE INVENTION

U.S. Pat. No. 5,806,466 (Pintor et al 1998) entitled "Pet Training Device" discloses an apparatus which includes a waist strap adapted for attachment around a waist of a dog trainer, a thigh strap adapted for attachment around a thigh of the trainer, a connecting strap adapted to be vertically positioned against a front portion of a thigh of the trainer connecting the waist strap and the thigh strap, and a training strap coupling the thigh strap to a collar of a dog.

SUMMARY OF THE INVENTION

According to the present invention there is provided an apparatus for training a dog to heel, which includes an elongated body adapted to be vertically positioned against an outside portion of a leg of a dog trainer. The body has a top end and a bottom end. The top end is adapted for positioning against the leg in the vicinity of the upper thigh of the dog trainer. The bottom end is adapted for positioning against the leg in the vicinity of a lower calf of the dog trainer. Straps are provided at intervals along the body. The straps are adapted for strapping the body to the leg of the dog trainer. More than one training strap coupling is positioned at spaced vertical intervals along the body. The dog trainer connects a short training strap extending to a collar of a dog being trained at a selected training strap coupling at a height of the collar of the dog.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
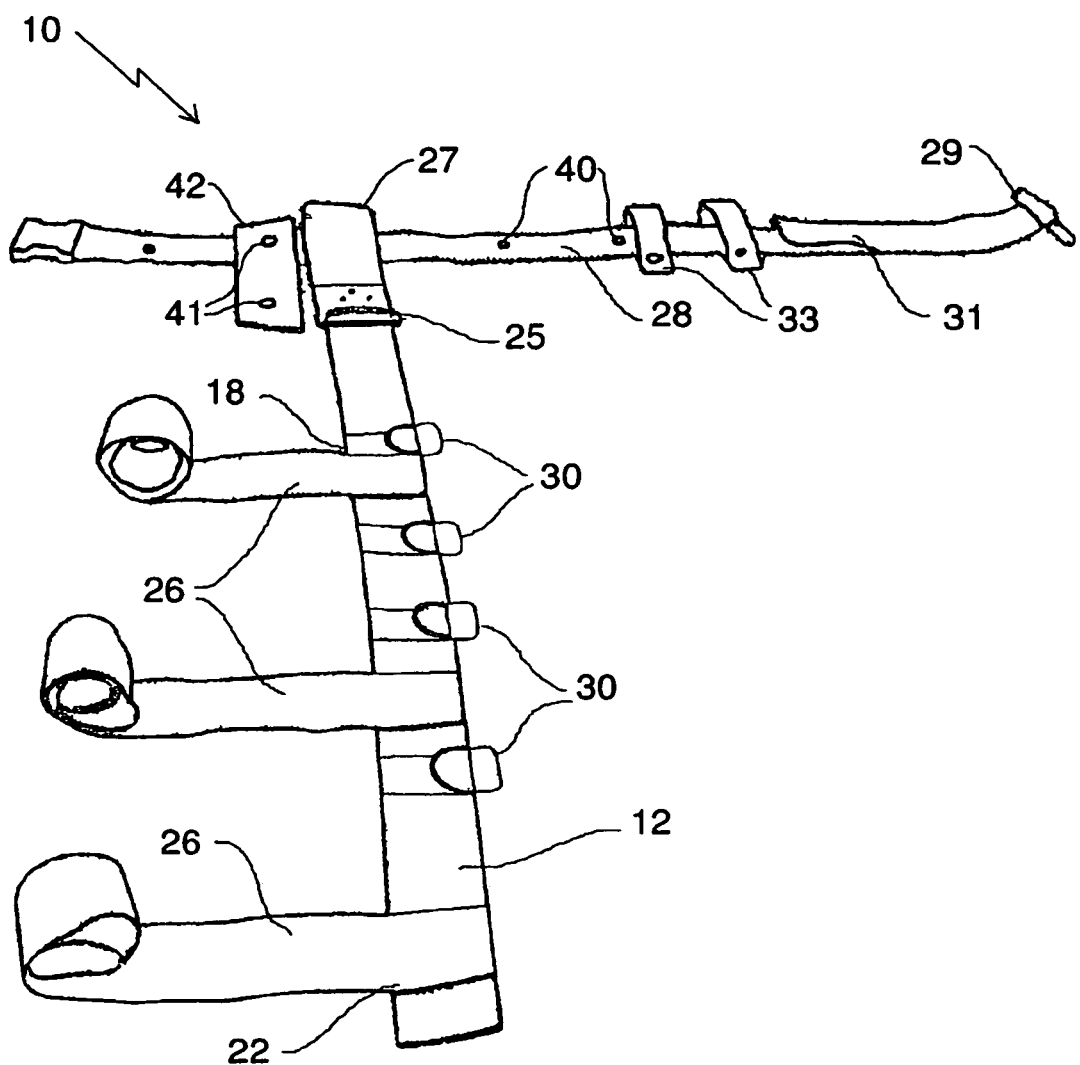
FIG. 1 is a perspective view of the apparatus for training a dog to heel in accordance with the teachings of the present invention.

The preferred embodiment, an apparatus for training a dog to heel generally identified by reference numeral 10, will now be described with reference to FIG. 1 through 5.

Figure 3:
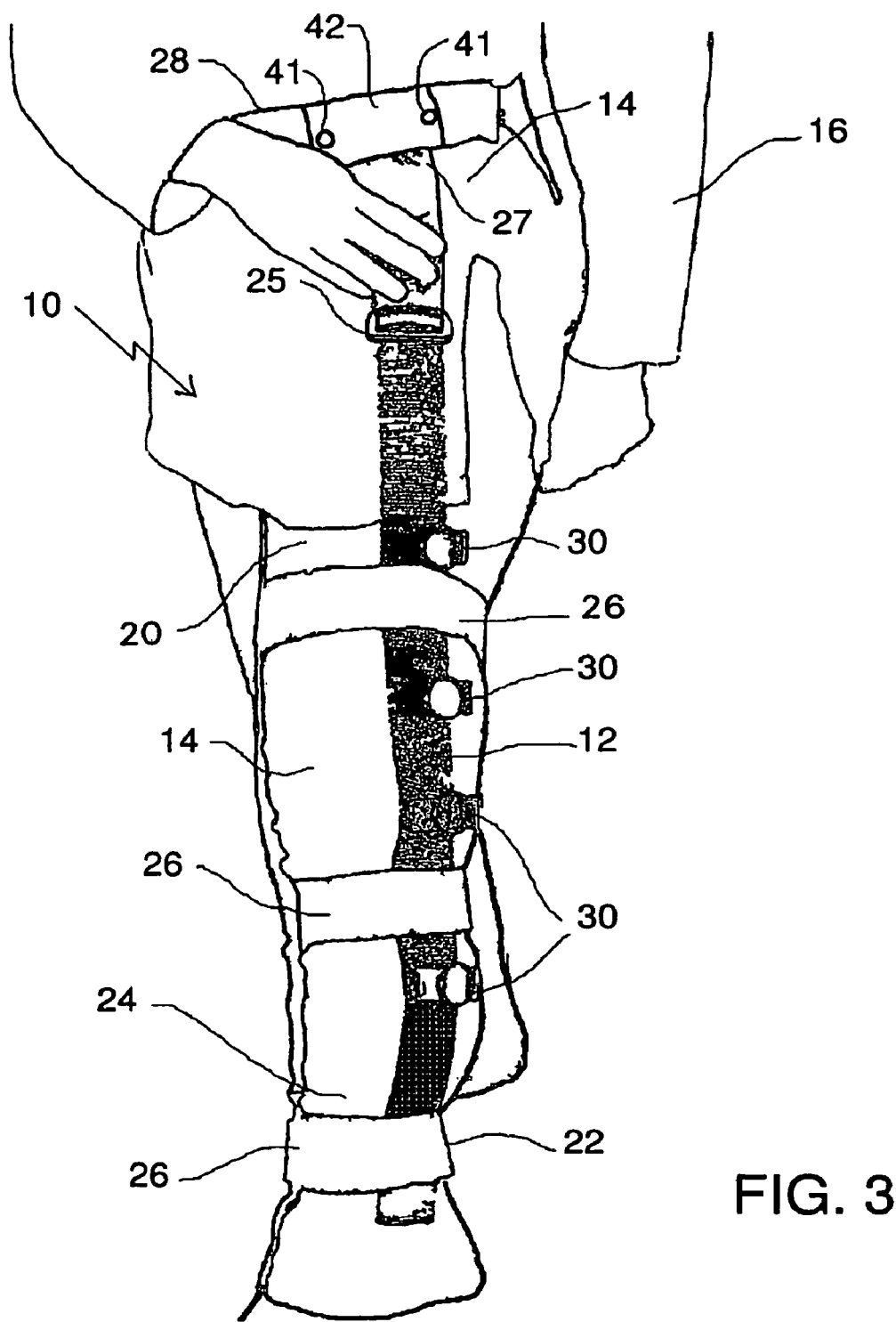
FIG. 3 is a side elevation view of the apparatus in FIG. 1 strapped to a leg.

Structure and Relationship of Parts:

Referring to FIG. 1, apparatus 10 includes an elongated body 12. Referring to FIG. 3, elongated body 12 is adapted to be vertically positioned against an outside portion of a leg 14 of a dog trainer 16. Body 12 has a top end 18 adapted for positioning against leg 14, normally the left, in the vicinity of the upper thigh 20 of dog trainer 16 and a bottom end 22 adapted for positioning against leg 14 in the vicinity of a lower calf 24 of dog trainer 16. A length of body 12 is adjustable to suit differing leg lengths. This length adjustment is accomplished through the use of buckle 25.

Figure 2:
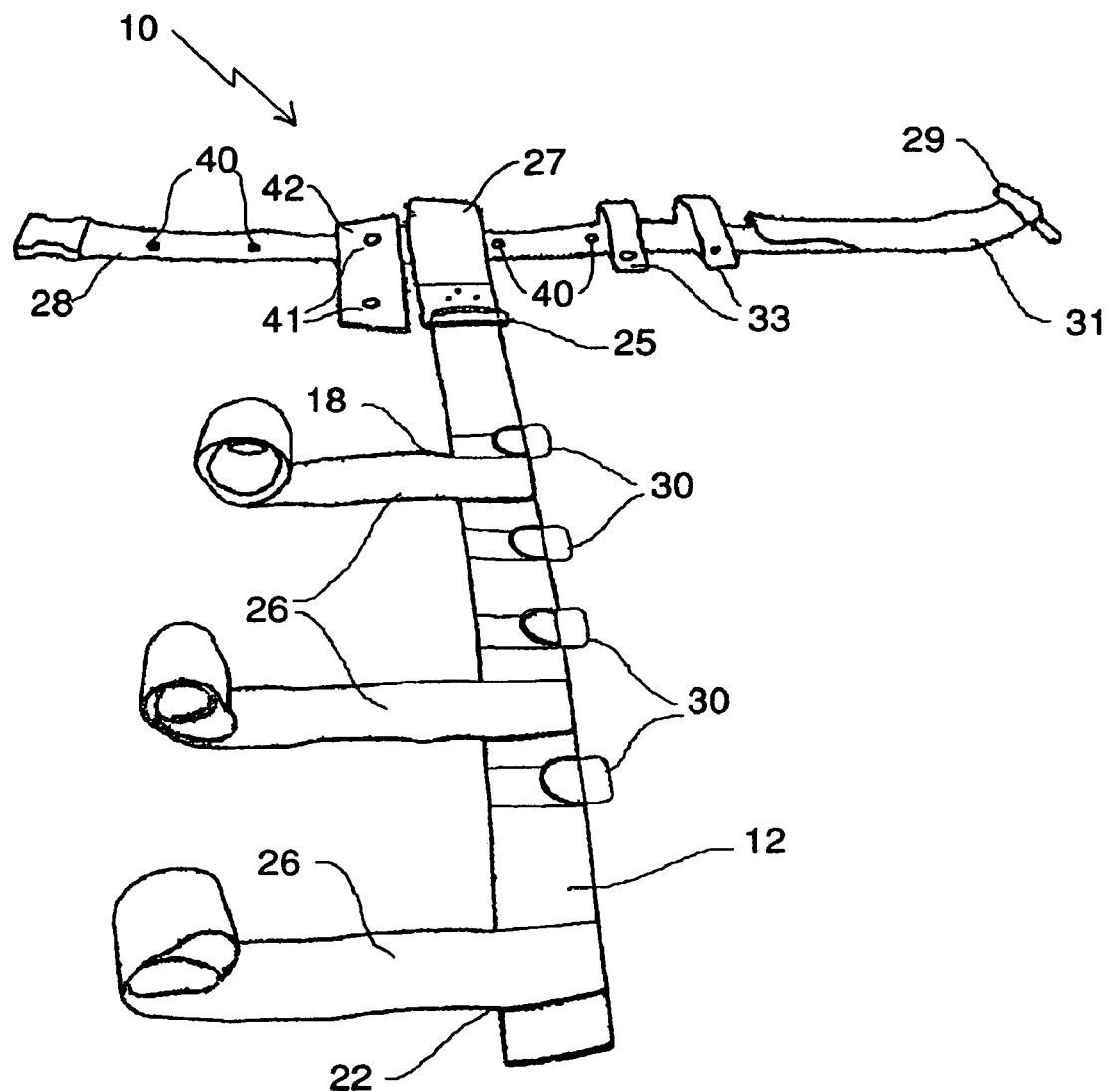
FIG. 2 is a perspective view of the apparatus in FIG. 1 with the body repositioned along the waist strap.

Referring again to FIG. 1, there are several leg straps 26 positioned at intervals along body 12 adapted for strapping body 12 to leg 14 of dog trainer 16. This may be done using buckles or Velcrom™. A waist strap 28 is secured to top end 18 of body 12 by length to prevent body 12 from sliding down leg 14. Waist strap 28 is adjustable to suit differing waist circumferences. As illustrated, waist strap clip 29 allows waist strap 28 to be attached and to be tightened by pulling on the loose end 31 of waist strap 28, and loosened by pushing loose end 31 through waist strap clip 29. Loops 33 on waist strap 28 hold loose end 31 in place, and may also be used to carry training tools or accessories such as extra leashes, airing bags, kongs, flexi-leashes, bumpers, etc. As waist strap 28 is adjusted, it will also be necessary to adjust the position of body 12 along waist strap 28, such that body 12 is always positioned on the outside of the hip 15 of dog trainer 16 as shown in FIG. 3, in other words, such that body 12 is aligned with the outer seam of the pants. The new position is fixed using strap 42 to overlap the connecting end 27 of body 12 that connects body 12 to waist strap 28 while still allowing movement along waist strap 28. Strap 42 has male snaps 41 at each end at a distance that corresponds to the distance between female snaps 40 on waist strap 28, such as an interval of 2". Referring to FIG. 3, strap 42 is shown overlapping connecting end 29. Referring to FIG. 2, body 12 and strap 42 are shown in a different position along waist strap 28.

Figure 4:
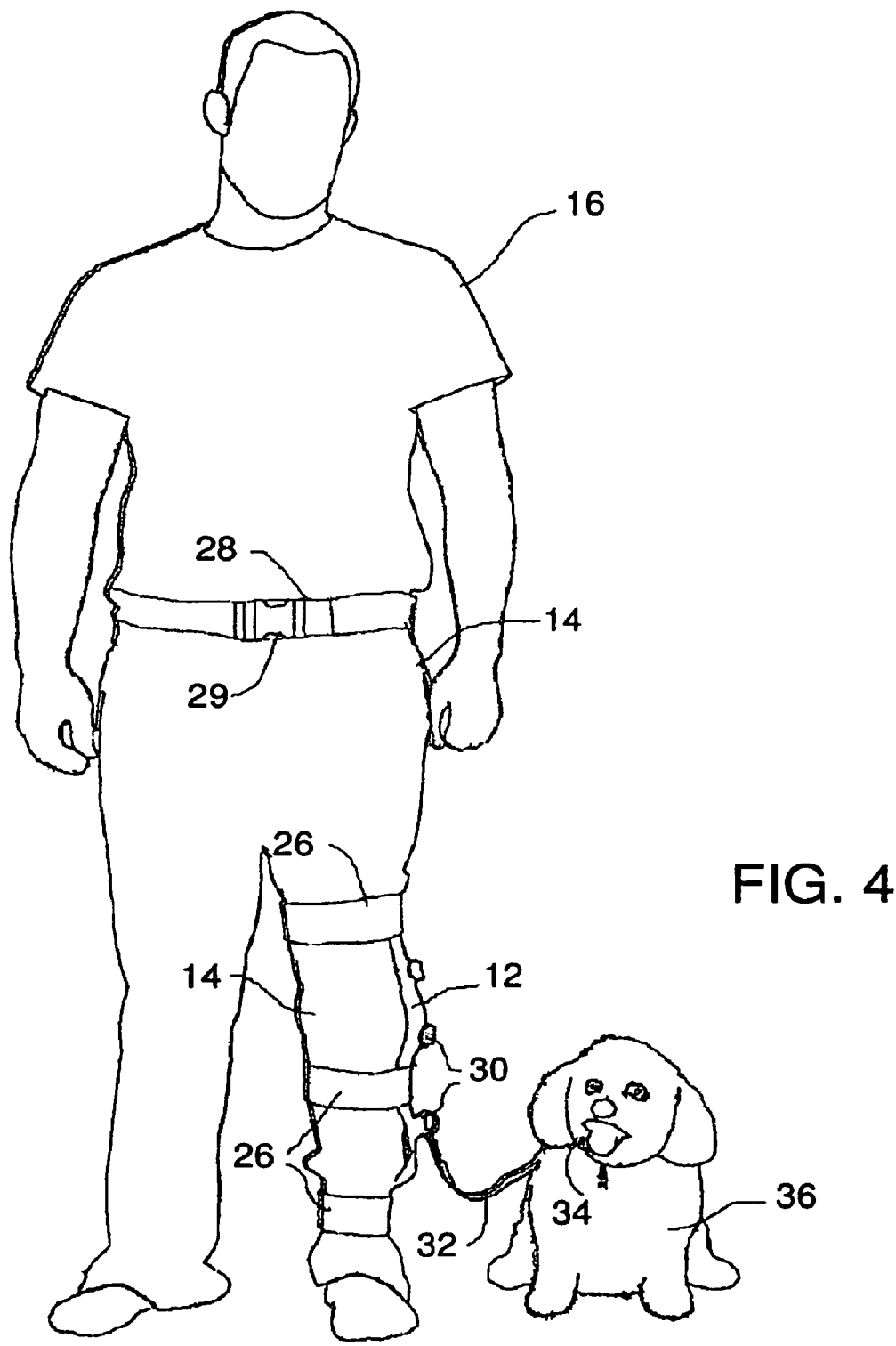
FIG. 4 is a front elevation view of the apparatus strapped to the leg of a taller dog trainer and connected to a smaller dog.
Figure 5:
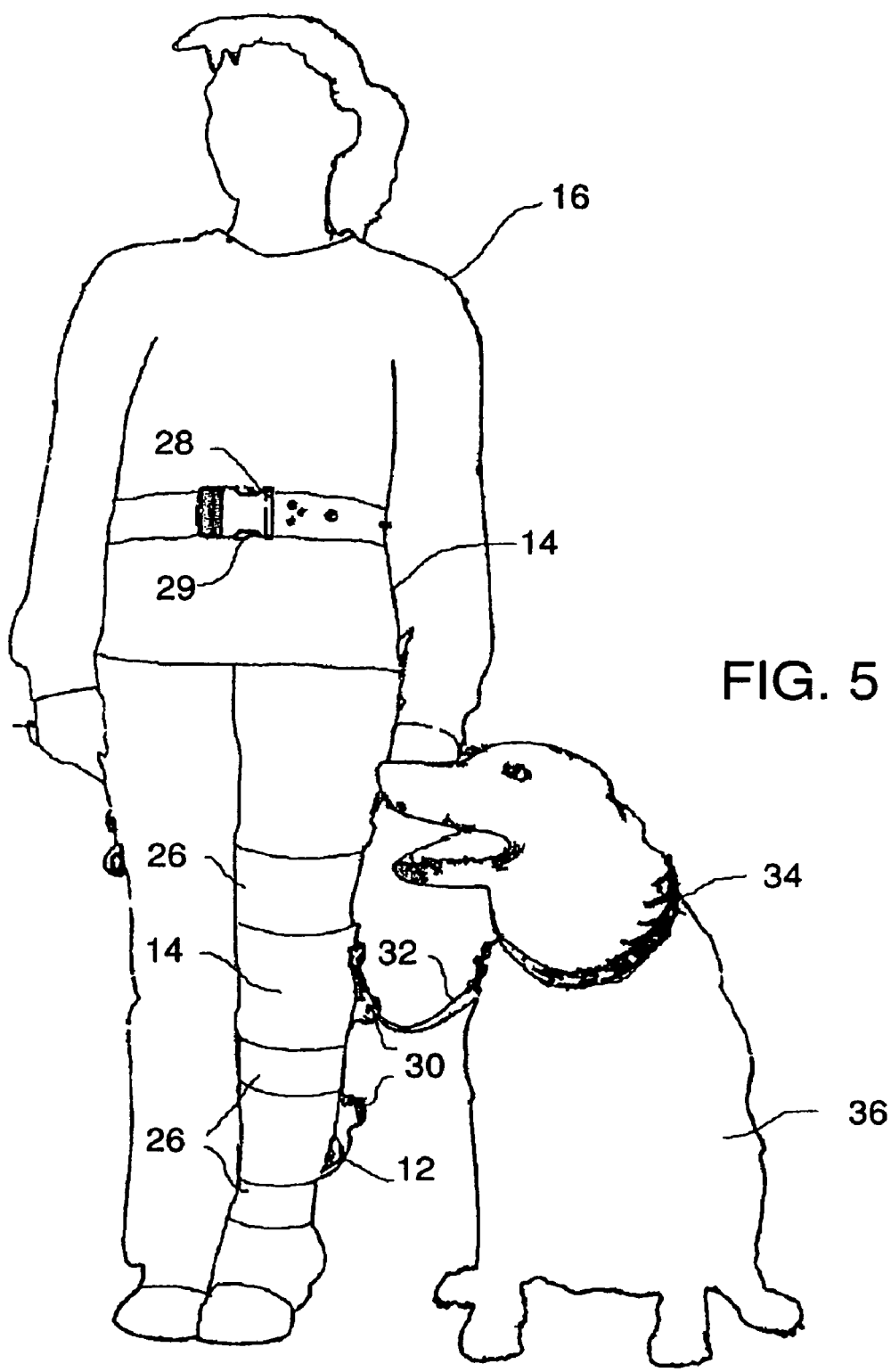
FIG. 5 is a front elevation view of the apparatus strapped to the leg of a shorter dog trainer and connected to a larger dog.

Referring to FIGS. 4 and 5, multiple training strap couplings 30 are positioned at spaced vertical intervals along body 12, such that dog trainer 16 connects a short training strap 32 extending to a collar 34 of a dog 36 being trained at a selected training strap coupling 30 at a height of collar 34 of dog 36. To demonstrate the versatility of apparatus 10, FIG. 4 shows a larger person with a smaller dog, and FIG. 5, shows a shorter person with a larger dog.

Operation:

The use and operation of dog training apparatus 10 will now be discussed with reference to FIGS. 1 through 5. Referring to FIG. 3, body 12 is attached to left leg 14 of dog trainer 16 by wrapping leg straps 26 around different parts of leg 14, such as upper thigh 20, and lower calf 24. Top end 18 is also secured by wrapping waist strap 28 around dog trainer 16 and engaging waist strap clip 29. Waist strap 28 is adjusted to different waist sizes by pulling on loose end 31 of waist strap 28 that passes through waist strap clip 29, or pushing it through in the other direction, then repositioning body 12 along waist strap 28 as shown in FIG. 2 such that body 12 is positioned on the outside part of hip 15 of dog trainer 16, as shown in FIG. 3. Once positioned, strap 41 secures connecting end 27 of body 12 by engaging male snaps 41. The length of body 12 is then adjusted for the height of dog trainer 16 using buckle 25. Referring to FIGS. 4 and 5, once body 12 has been attached to leg 14 of dog trainer 16, a short training strap 32 is attached to collar 34 of dog 36, and then attached to body 12 by means of one of the training strap couplings 30 that is closest in height to collar 34 of dog 36.

The Pintor et al reference taught the use of a single attachment location for attaching a training strap to the collar of the dog. This attachment location was on the front of the thigh of the dog trainer at the height of the upper thigh. In contrast, referring to FIG. 2, body 12 of apparatus 10 is on the outside of thigh 20 of dog trainer 16 and provides a plurality of attachment locations 30. When used correctly, dog trainer 16 will attach a short training strap 32 at the height of collar 34 of dog 36. It is critical that training strap be attached at the height of collar 34 of dog 36 in order to establish a lead and follow relationship between dog 36 and the left leg 14 of dog trainer 16. The Pintor et al reference did not establish this critical relationship, as is apparent from a review of FIG. 1 of the Pintor et al referenced. For all but the largest breeds of dog, the attachment location as taught by Pintor et al would be too high resulting in an upward tug on the dog and a delayed corrective action as the dog trainer walked. Furthermore, the smaller the breed of dog, the longer the length of the training strap required. As the training strap is lengthened control over the dog is lost. Referring to FIGS. 4 and 5, it can be seen that this difficulty is avoided in the present invention, where a taller person is training a smaller dog in FIG. 4, and a shorter person is training a larger dog in FIG. 5, but the connection with training strap 32 is always at the height of collar 34.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. An apparatus for training a dog to heel, the apparatus comprising:
   a waist strap for securing the apparatus to a waist of a dog trainer;
   an elongated body which is coupled to the waist strap so as to be positionable against an outside portion of a leg of the dog trainer, the elongated body having a top end for positioning adjacent the waist of the dog trainer and a bottom end for positioning against a lower calf of the dog trainer;
   first, second and third straps being located at spaced intervals along the elongated body for coupling the elongated body to the leg of the dog trainer, the first strap for securing an upper portion of the elongated body to a thigh of the dog trainer, the second strap for securing an intermediate portion of the elongated body adjacent a knee of the dog trainer, and the third strap for securing a lower portion of the elongated body to the lower calf of the dog trainer; and
   at least first and second training strap couplings positioned at spaced intervals along the elongated body, the first training strap coupling being located closer to the first strap than the third strap and the second training strap coupling being located closer to the third strap than the first strap, and the first and the second training strap couplings enabling attachment of a short training strap for the dog such that the dog trainer connects the short training strap, extending to a collar of the dog being trained, at a selected one of the first and the second training strap couplings substantially at a height of the collar of the dog.

2. The apparatus for training a dog according to claim 1, further comprising a third training strap coupling and the third training strap coupling is located between the first strap and the second strap.

3. The apparatus for training a dog according to claim 1, further comprising a third training strap coupling and the third training strap coupling is located between the first strap and the second strap and the first training strap coupling is located between the first strap and the waist strap.

4. The apparatus for training a dog according to claim 1, further comprising a third training strap coupling, the second and the third training strap couplings are located between the first strap and the second strap and the first training strap coupling is located between the first strap and the waist strap.

5. An apparatus for training a dog to heel, the apparatus comprising:
   a waist strap for securing the apparatus to a waist of a dog trainer;
   an elongated body which is coupled to the waist strap so as to be positionable against an outside portion of a leg of the dog trainer, the elongated body having a top end for positioning adjacent the waist of the dog trainer and a bottom end for positioning against a lower calf of the dog trainer;
   first, second and third straps being located at spaced intervals along the elongated body for coupling the elongated body to the leg of the dog trainer, the first strap for securing an upper portion of the elongated body to a thigh of the dog trainer, the second strap for securing an intermediate portion of the elongated body adjacent a knee of the dog trainer, and the third strap for securing a lower portion of the elongated body to the lower calf of the dog trainer; and
   first, second and third training strap couplings positioned at spaced intervals along the elongated body, the first training strap coupling being located closer to the first strap than the third strap, the third training strap coupling being located closer to the third strap than the first strap, and the second training strap coupling being located adjacent the second strap, and the first, the second and the third training strap couplings enabling attachment of a short training strap for the dog such that the dog trainer connects the short training strap, extending to a collar of the dog being trained, at a selected one of the first, the second and the third training strap couplings substantially at a height of the collar of the dog.

6. The apparatus for training a dog according to claim 5, further comprising a fourth training strap coupling and the fourth training strap coupling is located between the first strap and the second strap.

7. An apparatus for training a dog to heel, the apparatus comprising:
   a waist strap for securing the apparatus to the waist of the dog trainer;
   an elongated body which is coupled to the waist strap so as to be positionable against an outside portion of the leg of the dog trainer, the elongated body having a top end for positioning adjacent the waist of the dog trainer and a bottom end for positioning against the lower calf of the dog trainer;
   first, second and third straps being located at spaced intervals along the elongated body for coupling the elongated body to the leg of the dog trainer, the first strap for securing an upper portion of the elongated body to the thigh of the dog trainer, the second strap for securing an intermediate portion of the elongated body adjacent the knee of the dog trainer, and the third strap for securing a lower portion of the elongated body to the lower calf of the dog trainer; and first, second, third and fourth training strap couplings positioned at spaced intervals along the elongated body, the first training strap coupling being located between the waist strap and the first strap, the fourth training strap coupling being between the second and the third straps, and the second and the third training strap couplings being located between the first and the second straps, and the first, the second, the third and the fourth training strap couplings enabling attachment of a short training strap for the dog such that the dog trainer connects the short training strap, extending to a collar of the dog being trained, at a selected one of the first, the second, the third and the fourth training strap couplings substantially at a height of the collar of the dog.

* * * * *